US 12,098,963 B2

(12) United States Patent
Wiechert et al.

(10) Patent No.: US 12,098,963 B2
(45) Date of Patent: Sep. 24, 2024

(54) TEMPERATURE SENSOR ASSEMBLY (71) Applicants: TE Connectivity Germany GmbH, Bensheim (DE); TE Connectivity India Private Limited, Bangalore (IN)

(72) Inventors: Sebastian Wiechert, Speyer (DE); Kiranpal Singh, Bangalore (IN); Daniel Reis, Speyer (DE); Christoph Mueller, Speyer (DE); Sven Faas, Speyer (DE)

(73) Assignees: TE Connectivity Germany GmbH, Bensheim (DE); TE Connectivity India Private Limited, Bangalore (IN)

( * ) Notice: Subject to any disclaimer, the term of this patent is extended or adjusted under 35 U.S.C. 154(b) by 653 days.

(21) Appl. No.: 17/075,085

(22) Filed: Oct. 20, 2020

(65) Prior Publication Data

US 2021/0172810 A1 Jun. 10, 2021

(30) Foreign Application Priority Data

Dec. 4, 2019 (IN) .............................. 201941049895

(51) Int. Cl.
*G01K 7/16* (2006.01)
*G01K 1/08* (2021.01)
*G01K 1/14* (2021.01)

(52) U.S. Cl.
CPC ................. *G01K 7/16* (2013.01); *G01K 1/08* (2013.01); *G01K 1/14* (2013.01)

(58) Field of Classification Search
CPC .............. G01K 7/16; G01K 1/08; G01K 1/14
See application file for complete search history.

(56) References Cited

U.S. PATENT DOCUMENTS

| 3,099,922 | A | | 8/1963 | Crocker | |
|---|---|---|---|---|---|
| 3,309,237 | A | | 3/1967 | Kelchner et al. | |
| 4,643,586 | A | * | 2/1987 | Hansen | G01K 15/00 374/1 |
| 4,866,410 | A | * | 9/1989 | Deppe | G01K 7/16 374/E7.018 |
| 4,959,633 | A | * | 9/1990 | Kiraly | G01K 7/22 374/E7.018 |
| 2010/0254428 | A1 | * | 10/2010 | Rose | G01K 7/16 374/183 |
| 2011/0150034 | A1 | | 6/2011 | Breimon | |
| 2013/0182745 | A1 | | 7/2013 | Hertel et al. | |
| 2016/0320249 | A1 | | 11/2016 | Reiman et al. | |

(Continued)

FOREIGN PATENT DOCUMENTS

| CN | 108627257 A | * | 10/2018 | ............... G01K 1/08 |
|---|---|---|---|---|
| DE | 202010013086 U1 | * | 5/2011 | ............. G01K 15/00 |
| DE | 102022207562 A1 | * | 1/2024 | ............. G01K 1/143 |

(Continued)

OTHER PUBLICATIONS

Translation of WO2015197352A1 (Year: 2015).*

(Continued)

*Primary Examiner* — Mirellys Jagan
(74) *Attorney, Agent, or Firm* — Barley Snyder (57) ABSTRACT

A temperature sensor assembly including a carrier part having a receptacle for a temperature pin, a sensor element for measuring a temperature, and a pushing element pushing the sensor element into the receptacle.

15 Claims, 8 Drawing Sheets

(56) References Cited

U.S. PATENT DOCUMENTS

2017/0122814  A1    5/2017   Motooka et al.

FOREIGN PATENT DOCUMENTS

| EP | 4040125 A1 | * | 8/2022 | ............... G01K 1/08 |
| JP | 2017227557 A | * | 12/2017 | ............... G01K 1/14 |
| WO | WO-0055023 A1 | * | 9/2000 | ............ B60T 13/662 |
| WO | WO-2015197352 A1 | * | 12/2015 | ............... G01K 1/14 |
| WO | 2016007685 A1 | | 1/2016 | |

OTHER PUBLICATIONS

Translation of DE202010013086U1 (Year: 2011).*
Extended European Search Report, European Application No. 20211408.8-1001, European Filing Date, Apr. 29, 2021.
Examination Report from the European Patent Office dated Feb. 24, 2023, corresponding to Application No. 20 211 408.8-1001, 5 pages.

* cited by examiner

TEMPERATURE SENSOR ASSEMBLY

CROSS-REFERENCE TO RELATED APPLICATION

This application claims the benefit of the filing date under 35 U.S.C. § 119(a)-(d) of Indian Patent Application No. 201941049895, filed on Dec. 4, 2019.

FIELD OF THE INVENTION

The present invention relates to a sensor assembly and, more particularly, to a temperature sensor assembly.

BACKGROUND

Temperature sensors are used in a variety of fields, for example in the automotive field. Often, temperature pins, also referred to as temperature lances, are used to measure a temperature at a defined location. The temperature pin can, for example, be a part of an electric engine and positioned at the hottest point in the engine where a measurement of the temperature is possible. A problem associated with current temperature sensors is that the contacting of temperature pins that have different shapes, for example due to the production process or because different engine models are used, is difficult.

SUMMARY

A temperature sensor assembly including a carrier part having a receptacle for a temperature pin, a sensor element for measuring a temperature, and a pushing element pushing the sensor element into the receptacle.

BRIEF DESCRIPTION OF THE DRAWINGS

The invention will now be described by way of example with reference to the accompanying Figures, of which.

DETAILED DESCRIPTION OF THE EMBODIMENT(S)

The invention will now be described in greater detail and in an exemplary manner using advantageous embodiments and with reference to the drawings. The described embodiments are only possible configurations in which, however, the individual features as described herein can be provided independently of one another or can be omitted.

A temperature sensor assembly 100 according to an embodiment is shown in FIGS. 1-4. The temperature sensor assembly 100, for example, is used in the automotive field. The temperature sensor assembly 100 comprises a carrier part 10 with a receptacle 20 for a temperature pin 50. The temperature pin 50 can, for example, be located on an engine housing of a car. A temperature measured at the temperature pin 50 can relate to a temperature of critical parts of the engine.

Figure 2:
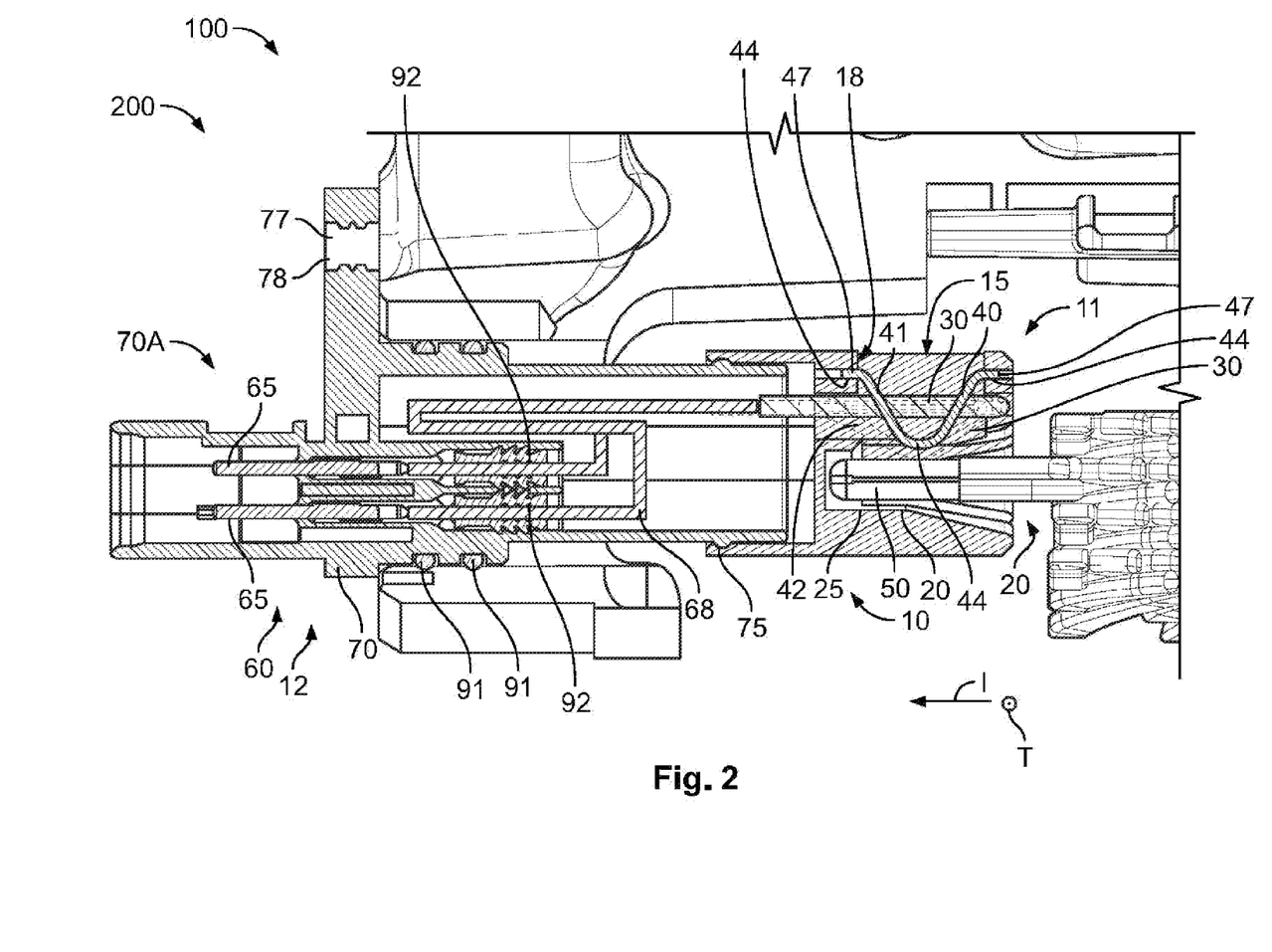
FIG. 2 is a sectional side view of the temperature sensor assembly of FIG. 1 mounted to an engine.

In order to sense the temperature at the temperature pin 50, the temperature sensor assembly 100 further comprises a sensor element 30, shown in FIG. 2. The sensor element 30 can, for example, comprise temperature-dependent resistors or other temperature-dependent electrical components.

The temperature pins 50 are usually shaped differently due to manufacturing tolerances. For example, they can be welded and the welding can result in different dimensions or shapes. In order to always contact the temperature pin 50 correctly, the temperature sensor assembly 100 further comprises a pushing element 40, shown in FIGS. 2 and 3, for pushing the sensor element 30 into the receptacle 20 and thus onto the temperature pin 50.

The pushing element 40 is adapted to push the sensor element 30 into the receptacle 20 at a side 25 of the receptacle 20 and thus onto a side of the temperature pin 50, as shown in FIG. 2. The pushing element 40 pushes the sensor element 30 along a transverse direction T that is transverse, in particular perpendicular to an insertion direction I of the receptacle 20, along which the temperature pin 50 is inserted into the receptacle 20. The sensor element 30 and/or the pushing element 40 can form a side of the receptacle 20. The pushing element 40 allows the contacting of differently shaped temperature pins 50. It is adapted to push the sensor element 30 onto differently shaped temperature pins 50.

Figure 3:
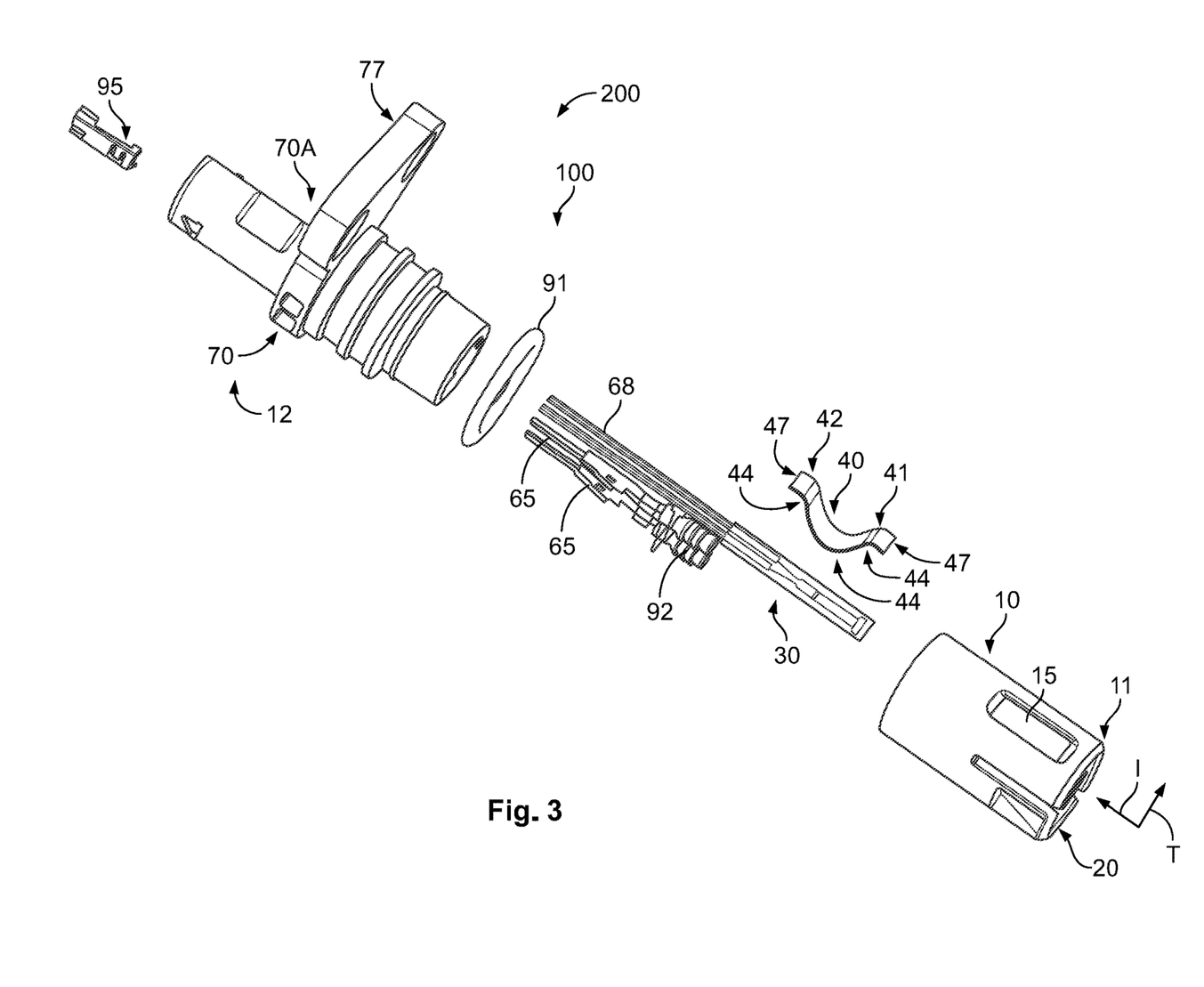
FIG. 3 is an exploded perspective view of the temperature sensor assembly of FIG. 1.
Figure 4:
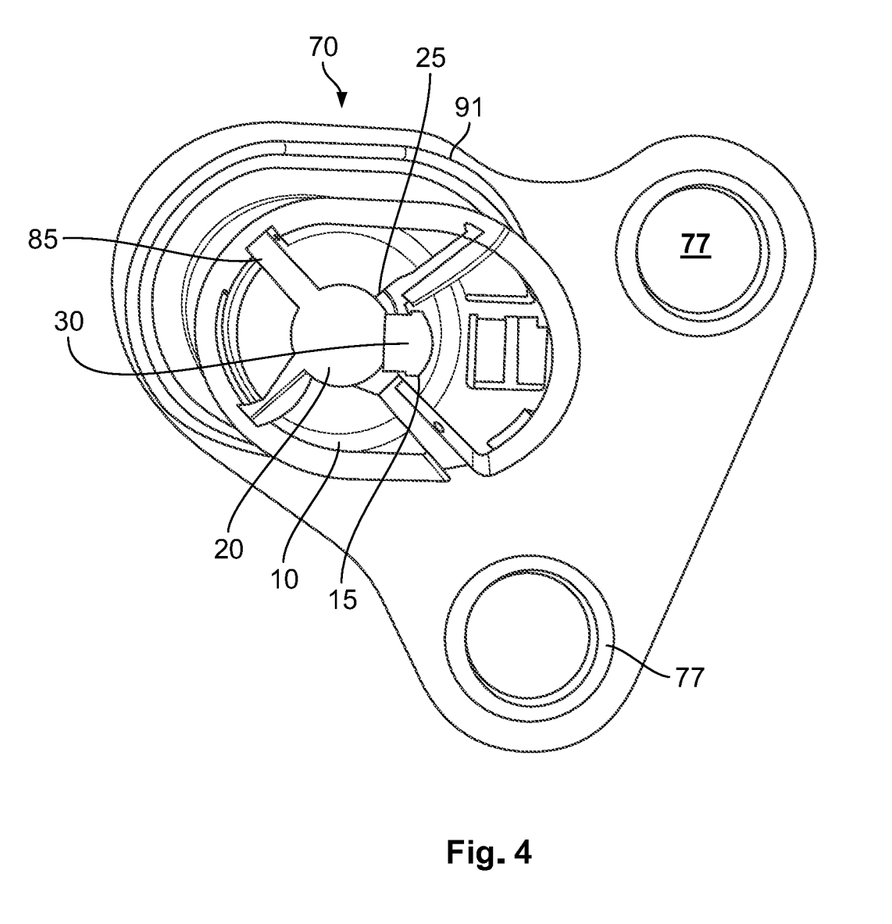
FIG. 4 is a perspective view of the temperature sensor assembly of FIG. 1.

As shown in FIGS. 2 and 3, the pushing element 40 of the depicted embodiment is a single element, namely a spring element 41. The spring element 41 is, in the shown embodiment, a leaf spring 42 having three curves 44 with alternating curvature directions and two end sections 47 that are held in slits 18 of the carrier part 10. Alternating curvature direction can mean that, for example, a curve going to the right is located between two curves going to the left. The pushing element 40 is made from a metal strip, for example by cutting, bending and/or coining.

The pushing element 40 contacts the sensor element 30 at the central curve 44. In FIG. 2, the sensor element 30 is shown twice. Once, namely in the fully visible version, the undeflected position of the sensor element 30 shown. The deflected configuration of the sensor element 30 is shown in a further version in broken lines.

The temperature sensor assembly 100, as shown in FIG. 2, includes a recess 15 for at least partially accommodating the pushing element 40. This recess 15 is open towards the receptacle 20 and/or in communication with the receptacle 20 so that the sensor element 30 can be pushed onto the temperature pin 50. The recess 15 is slot-shaped to allow an easy movement of the sensor element 30 and the pushing element 40. Stretching recesses 85 on the carrier part 10, shown in FIG. 4, allow an expansion of the receptacle 20 when the temperature pin 50 is inserted. The recess 15 can serve to protect the pushing element 40.

The temperature sensor assembly 100, as shown in FIG. 2, comprises a connection section 60 with at least one terminal 65 for connection to a processing module. In such a processing module, the signals from the temperature sensor assembly can be further processed. To allow an easy mounting, the receptacle 20 is located at a first side 11 of the temperature sensor assembly 100 and the connection section 60 is located at a second side 12 of the temperature sensor assembly 100 opposite the first side 11. The definition of the two sides 11, 12 can be relative to an insertion direction I of the receptacle 20 and/or the pin 50. One side can be located behind the other along the insertion direction I. The processing module can, for example, be an engine control unit (ECU) of a car.

As shown in FIG. 2, the connection section 60 is located in a housing part 70 that is detachable from the carrier part 10. It can be attached and detached repeatedly. In other versions, the housing part 70 and/or the connection section 60 could be integral with the carrier part 10.

At least one terminal 65 in the connection section 60 is connected to the sensor element 30. Such a connection can be either direct or indirect via an intermediate element such as a wire or cable 68.

Figure 1:
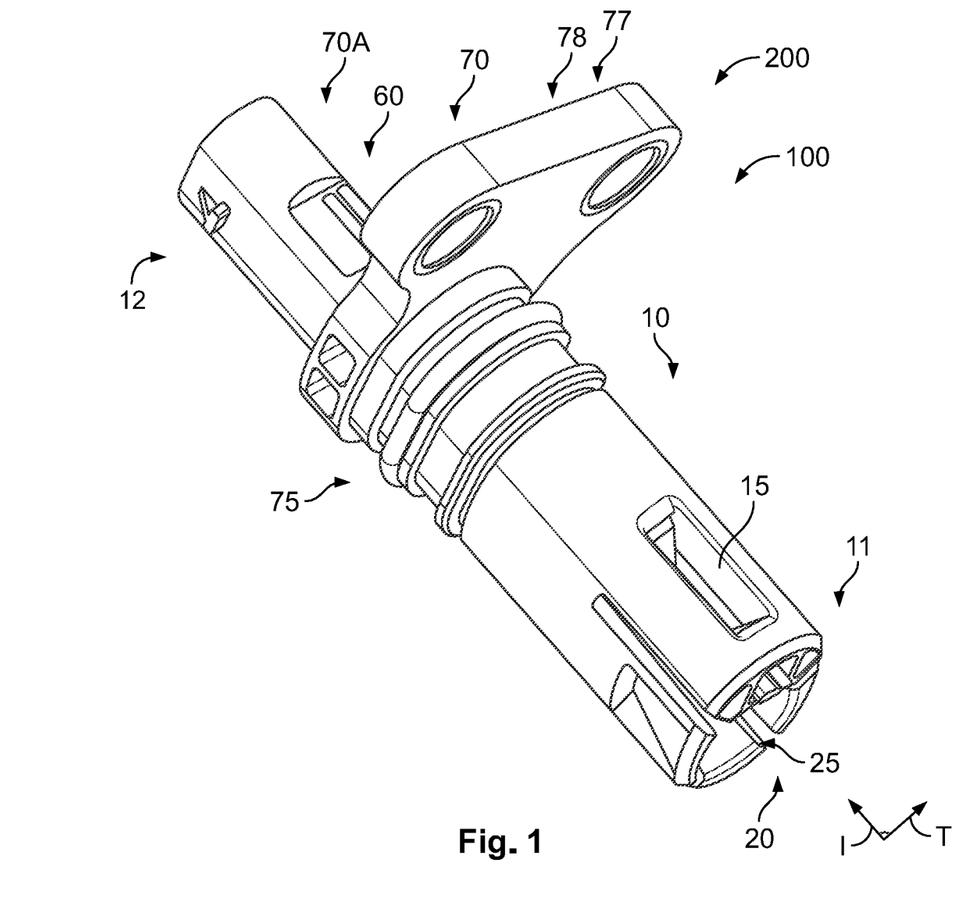
FIG. 1 is a perspective view of a temperature sensor assembly according to an embodiment.

The carrier part 10 and the housing part 70 are adapted to be attached to each other, as shown in FIGS. 1-3. They can comprise locking members, fixing members or attachment members 75. For example, a latching mechanism can allow a latching connection between the two.

Figure 6:
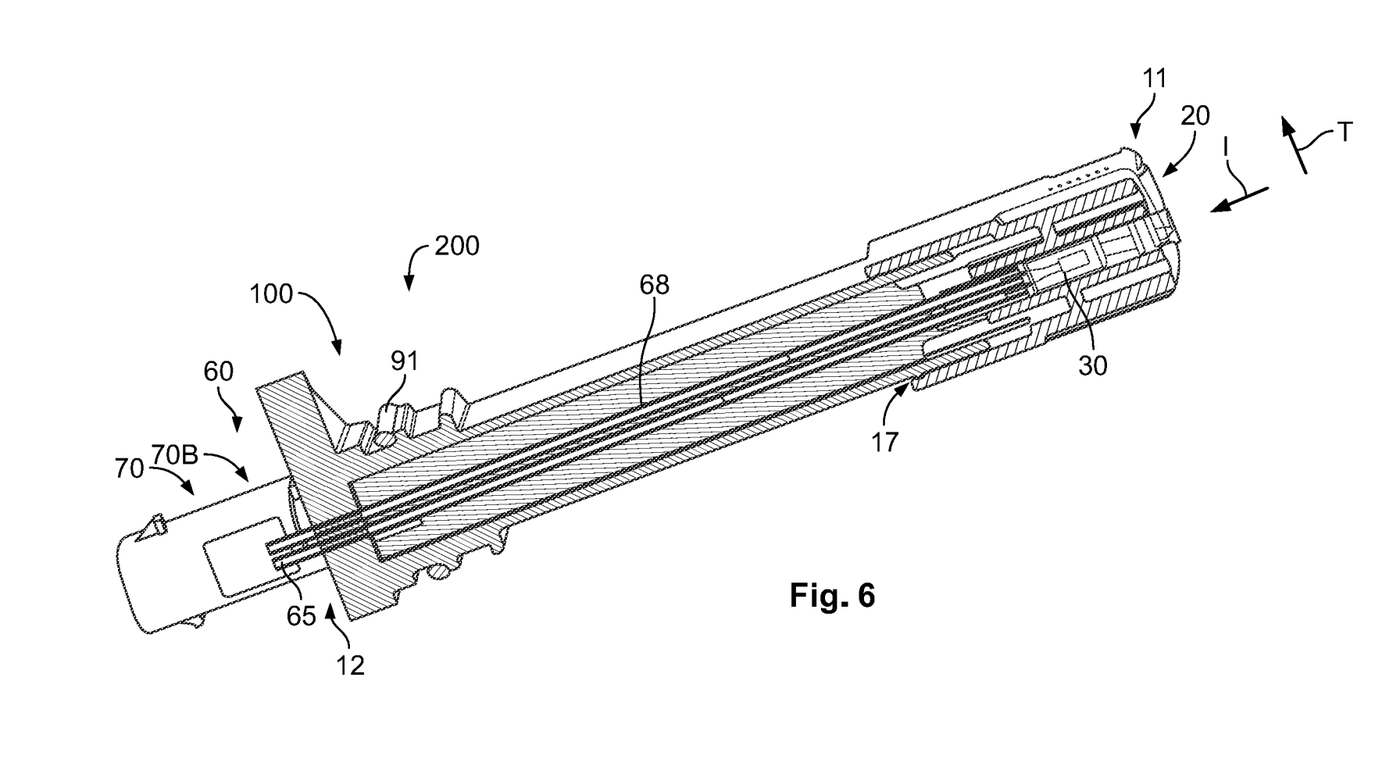
FIG. 6 is a sectional perspective view of the temperature sensor assembly of FIG. 5.

The carrier part 10 comprises a housing part receptacle 17 for at least partially receiving the housing part 70, as shown in the embodiment of FIG. 6. The housing part 70 is adapted to be fixed to an external element, in particular an element of an automobile. It comprises a fixing member 77, shown in FIGS. 1-4, for example in the form of at least one threaded hole 78.

The temperature sensor assembly 100, as shown in FIGS. 1 and 2, comprises sealing elements 91, 92. The sealing elements 91, 92 include first sealing elements 91 for sealing together with further elements, for example a part of an automobile, and cable sealings 92 or terminal sealing for sealing between a cable or terminal and a part of the temperature sensor assembly 100, for example the housing part 70.

Figure 5:
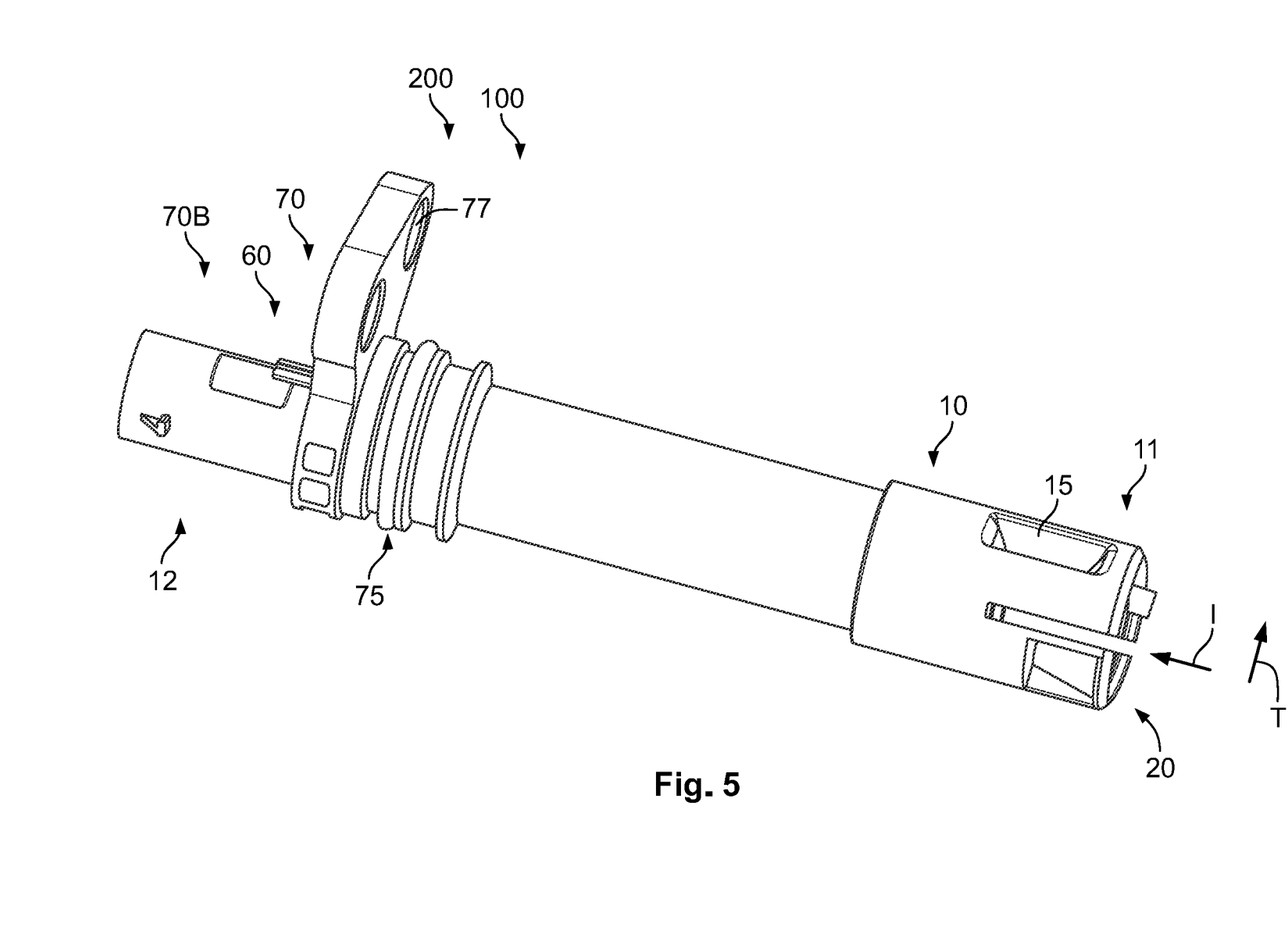
FIG. 5 is a perspective view of a temperature sensor assembly according to another embodiment.

In FIGS. 5 and 6, a second embodiment of the temperature sensor assembly 100 is shown. It differs in particular from the first embodiment in the length of the housing part 70 in which the connection section 60 is located. In the second embodiment, the housing 70, 70B is longer than the housing 70, 70A in the first embodiment along the insertion direction. With such a longer housing part 70, the temperature sensor assembly 100 can be used for a different kind of engine and/or car.

Each of the two embodiments can be seen as a set 200 for a temperature sensor assembly 100, shown in FIGS. 1-6, comprising a carrier part 10 with a receptacle 20 for a temperature pin 50, a sensor element 30 for measuring the temperature, a pushing element 40 for pushing the sensor element 30 into the receptacle 20 and a housing part 70 that is detachable from the carrier part 10 and that comprises a connection section 60 with at least one terminal 65 for connection to a processing module.

The set 100, in an embodiment, further comprises at least one cable 68 for connecting the sensor element 30 to the terminal 65, as shown in FIGS. 2 and 6. The cable 68 can be pre-mounted to the sensor element 30, but not to the terminal 65, so that the same cable 68 can be used for producing different temperature sensor assemblies 100. Depending on the length of the housing part 70, the cable 68 can be cut to an appropriate length and a terminal 65 can then be added to the cable 68.

A set 200 can in particular comprise at least two different housing elements 70, 70A, 70B, differing for example in dimensions, in particular lengths, or the kind and number of fixing members 77. With such a set 200 the user can create an appropriate temperature sensor assembly 100 for different types of cars.

In order to improve the temperature measurement, thermal compound, also known as heat paste or thermal paste, can be present in the receptacle 20. The thermal compound can in particular fill the area between and around the temperature pin 50 and the sensor element 30. The thermal compound can be premounted in the receptacle 20 before the temperature pin is inserted or be applied later.

Figure 7:
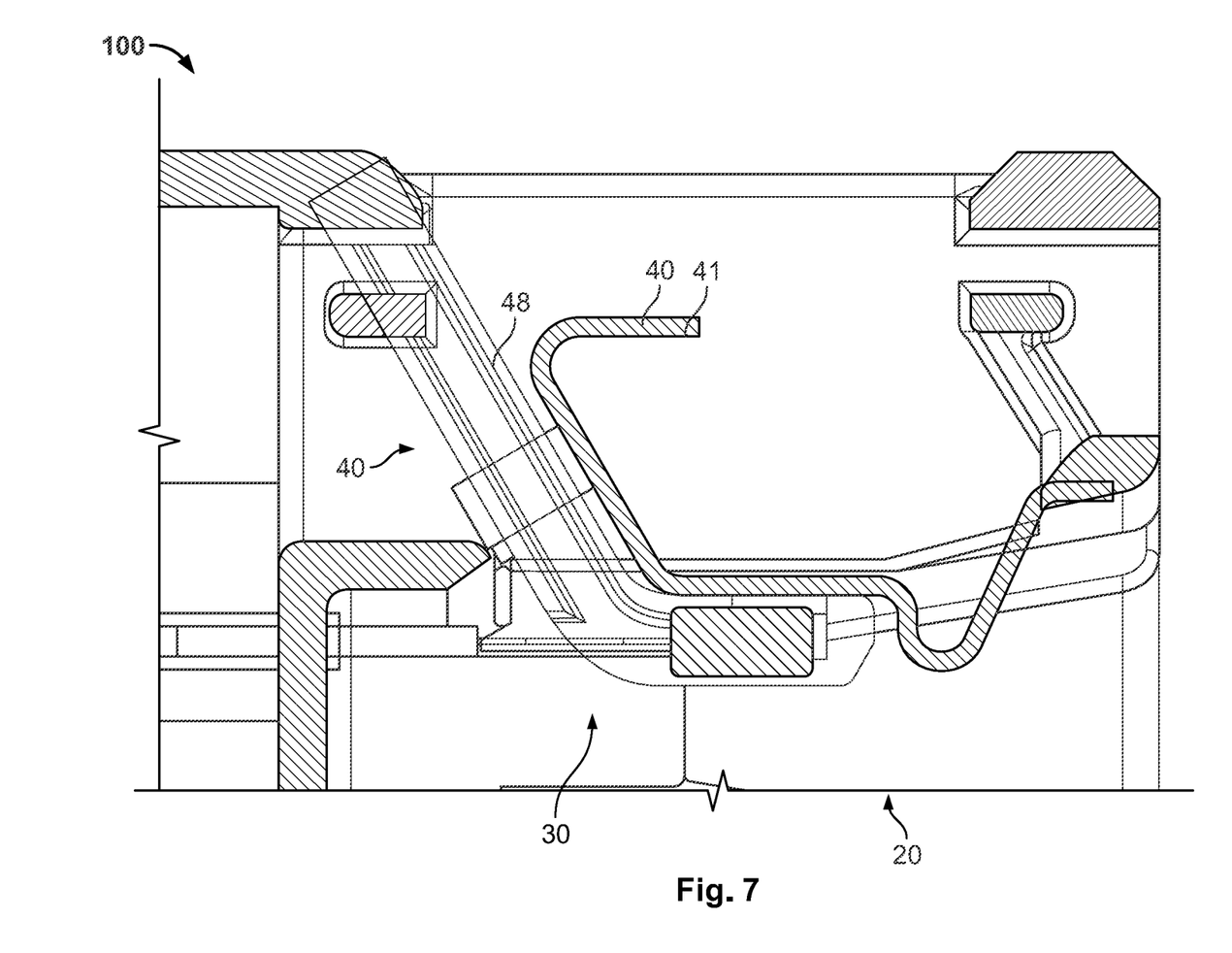
FIG. 7 is a sectional side view of a temperature sensor assembly according to another embodiment.
Figure 8:
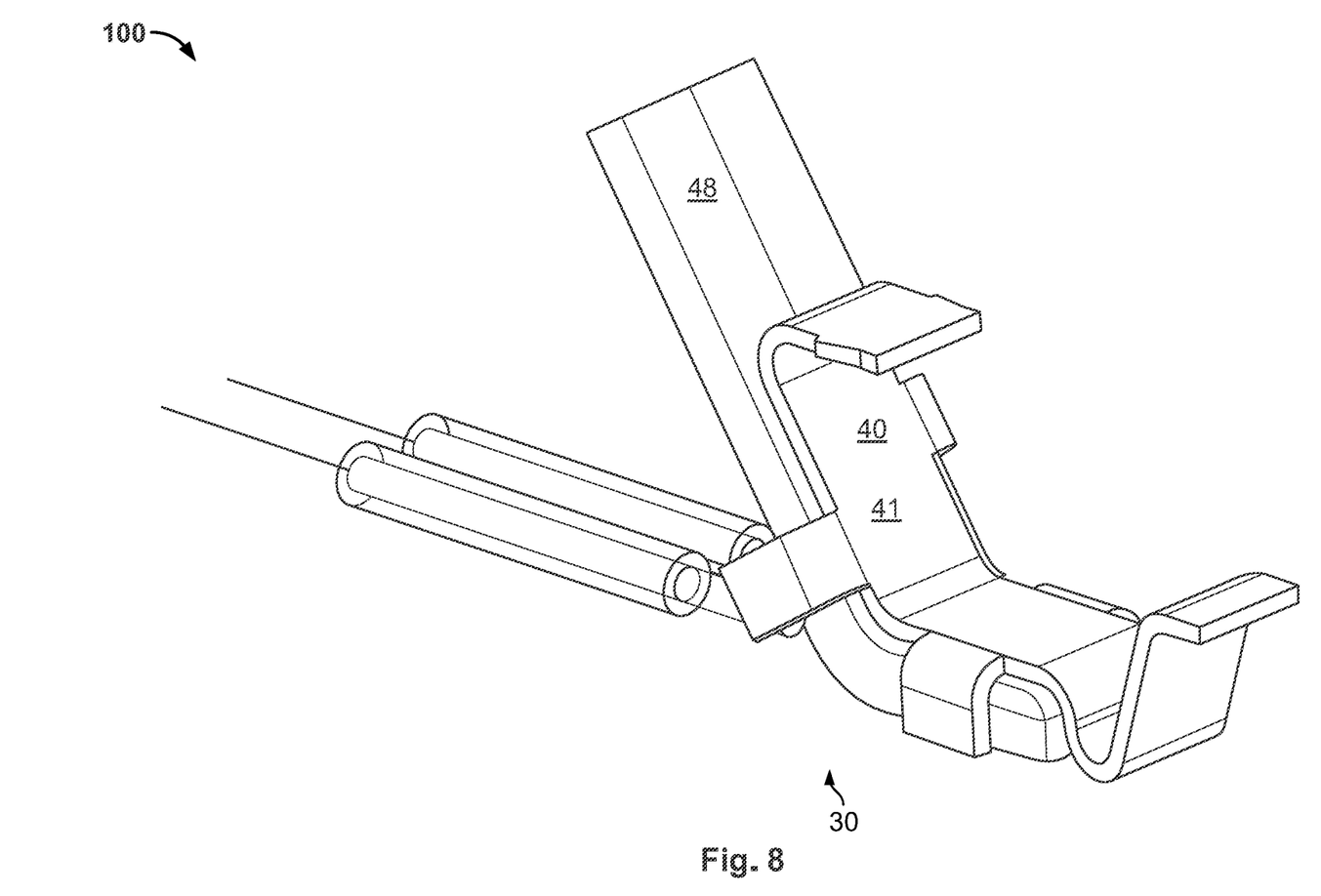
FIG. 8 is a perspective view of the temperature sensor assembly of FIG. 7.

FIGS. 7 and 8 show a further embodiment of a temperature sensor assembly 100. The sensor element 30 is again pushed into the receptacle by a pushing element 40. The pushing element 40 comprises a spring element 41 that is attached to an insulation element 48. The spring element 41 can be made from a metal and the insulation element 48 can be made from a material that is thermally and electrically insulating, for example plastic or resin. The sensor element 30 can at least be partially embedded in the insulation element 48.

What is claimed is:

1. A temperature sensor assembly, comprising:
a carrier part having a receptacle for a temperature pin;
a sensor element for measuring a temperature of the temperature pin; and
a pushing element pushing the sensor element into the receptacle and deflecting the sensor element against the temperature pin, the pushing element being a spring element.

2. The temperature sensor assembly of claim 1, wherein the pushing element pushes the sensor element into the receptacle at a side of the receptacle.

3. The temperature sensor assembly of claim 1, further comprising a recess in the carrier part at least partially accommodating the pushing element.

4. The temperature sensor assembly of claim 3, wherein the recess is slot-shaped.

5. The temperature sensor assembly of claim 1, wherein the spring element is a leaf spring.

6. The temperature sensor assembly of claim 5, wherein the leaf spring has a plurality of curves with alternating curve directions.

7. The temperature sensor assembly of claim 6, wherein the leaf spring is attached to the carrier part at a pair of end sections of the leaf spring.

8. The temperature sensor assembly of claim 1, further comprising a connection section with a terminal, the connection section being attachable to the carrier part and the terminal connecting to a processing module.

9. The temperature sensor assembly of claim 8, wherein the receptacle is at a first side of the temperature sensor assembly and the connection section is at a second side of the temperature sensor assembly opposite the first side.

10. The temperature sensor assembly of claim 8, wherein the connection section is located in a housing part detachable from the carrier part.

11. The temperature sensor assembly of claim 10, wherein the carrier part has a housing part receptacle at least partially receiving the housing part.

12. The temperature sensor assembly of claim 10, wherein the housing part is fixed to an external element.

13. The temperature sensor assembly of claim 12, wherein the external element is an element of an automobile.

14. A set for a temperature sensor assembly, comprising:
a carrier part having a receptacle for a pin;
a sensor element for measuring a temperature of the pin; and a pushing element pushing the sensor element into the receptacle and deflecting the sensor element against the pin, the pushing element being a spring element; and a housing part detachable from the carrier part, the housing part having a connection section with a terminal for connection to a processing module.

15. The set of claim 14, wherein the housing part can be any of a plurality of different housing parts.

* * * * *